PULSE WIDTH MODULATED SERVO AMPLIFIER

Filed Sept. 7, 1965

Harold V. White
Herbert R. McCarley,
INVENTORS
BY
Harry M. Saragovitz
Edward J. Kelly
Herbert Berl
Robert C. Sims Harold V. White
Herbert R. McCarley,
INVENTORS.
Harry M. Saragovitz
BY Edward J. Kelly
Herbert Berl
Robert C. Sims United States Patent Office 3,422,326
Patented Jan. 14, 1969

3,422,326
PULSE WIDTH MODULATED SERVO AMPLIFIER
Harold V. White and Herbert R. McCarley, Huntsville, Ala., assignors to the United States of America as represented by the Secretary of the Army
Filed Sept. 7, 1965, Ser. No. 485,655
U.S. Cl. 318—18 2 Claims
Int. Cl. G05b; H02p 5/46; 7/68; 7/74

ABSTRACT OF THE DISCLOSURE

A device wherein a signal from a gyro pickoff is modulated with a triangular wave to provide a modulated square wave. Proper phase relationships of the square wave through an inverter and power switches to a power bridge provides a bi-directional load current control of a torquer connected to the power bridge output.

The invention described herein may be manufactured and used by or for the Government for governmental purposes without the payment of any royalty thereon.

This invention relates generally to a switching mode servo amplifier using pulse with modulation. Specifically, the invention relates to a pulse width modulated power amplifier consisting of a mixer, an inverter, two power switch drivers, and a power bridge made up of four power transistor switches.

In inertial guidance systems, the error signal generated by the gyroscope pickoff in any of the orthogonal axes of an inertial guidance platform must ultimately be raised to a power level sufficient to drive a gimbal actuator. The actuator, usually an AC servo motor or a DC torquer, is used to align a given gimbal to a reference position and to maintain it at this position when the gimbal is subjected to external torques.

Before power amplification, the pickoff signal is processed through electronics which typically consist of a preamplifier, demodulator and filter (if the pickoff signal is AC), and compensation networks. A typical way of obtaining the required power level is to remodulate, AC voltage amplify, and class B, AC power amplify the signal from the compensation networks. The output of the AC power amplifier is applied to the control phase of an AC servo motor. However, to drive a DC torquer by this method, a power demodulator and filter connected between the AC power amplifier and the torques are required. The straight AC method requires a demodulation circuit, large coupling transformers, large reactive components, and bypass and tuning capacitors. Because of the need of large reactive components, microminiaturization is not feasible.

It is, therefore, an object of this invention to provide a switching mode servo amplifier for driving a torquer.

A further obect of this invention is to provide a servo amplifier circuit which does not have the need for large reactive components.

A still further object of the present invention is to provide a servo amplifier circuit which can be fabricated by the integrated or hybrid technique.

The pulse width modulated power amplifier of the present invention consists of a mixer, an inverter, two power switch drivers, and a power bridge made up of four power transistor switches. The amplifier has a switching mode operation; therefore does not have the need for large reactive components. This feature makes circuit microminiaturization feasible. Fabrication of the switching mode circuit by the integrated or hybrid technique is, therefore, possible. Microminiaturization makes "on-gimbal" electronics packaging feasible. This eliminates 25 percent of the signal transfers from missile frame to gimbal and from gimbal to gimbal. The power amplifier of this invention has power output capability comparable to more conventional types used for the same purpose, yet features improved efficiency, greater reliability, lower cost, and the capability of being microminiaturized.

The invention further resides in and is characterized by various novel features of construction, combinations, and arrangements of parts which are pointed out with particularity in the claims annexed to and forming a part of this specification. Complete understanding of the invention and an introduction to other objects and features not specifically mentioned will be apparent to those skilled in the art to which it pertains when reference is made to the following detailed description of a specific embodiment thereof and read in conjunction with the appended drawing. The drawing, which forms a part of the specification, presents the same reference characters to represent corresponding and like parts throughout the drawing, and wherein:

Figure 1:
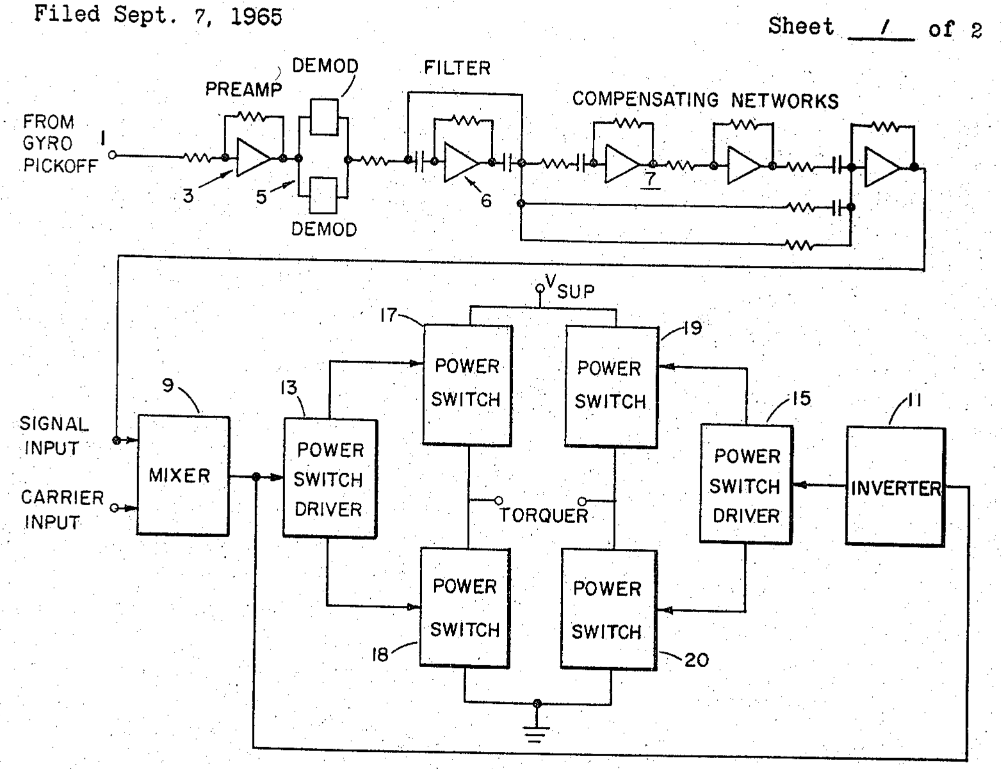
FIGURE 1 is a circuit diagram showing the basic concept of the present invention.

FIGURE 1 shows one of the control loops of an inertial guidance system. The error signal generated by the gyroscope pickoff is sent to input terminal 1 and then through preamplifier 3, demodulators 5, filter 6, compensation networks 7 to the signal input of the pulse width amplifier circuit. The pulse width modulated power amplifier consists of a mixer 9 having outputs conected to the input of an inverter 11, and the input of a power switch driver 13. The mixer 9 is a two-stage, over-driven amplifier which combines the error signal input with a carrier input. The output of the inverter 11 is fed to a power switch driver 15. The power switch driver 13 and 15 drive power switches 17 through 20. These power switches are connected in a bridge network. The output of the bridge network is fed to a torquer which stabilizes a gimbal of the inertial guidance platform.

Figure 2:
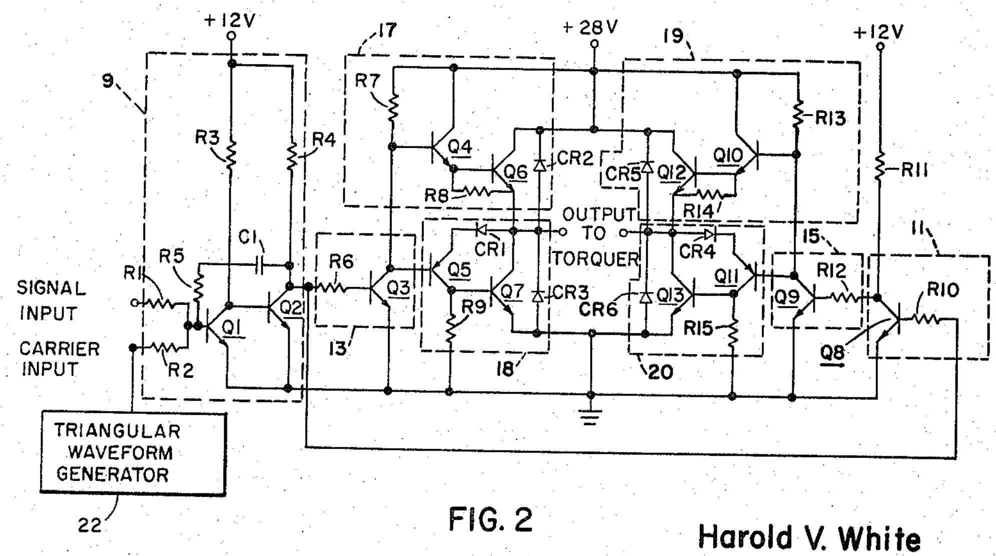
FIGURE 2 shows a schematic diagram illustrating a preferred form of the invention.

FIGURE 2 sets forth the components of the pulse width modulated power amplifier in greater detail. A triangular waveform generator 22 provides the carrier input to resistor R2. The signal input is fed to resistor R1, and both inputs are combined at the input of transistor Q1 of the mixer 9 to produce a width modulated wave at the output of transistor Q2 (see FIGURE 3). The feedback network of resistor R5 and capacitor C1 reduces switching transients at the output. Resistors R3 and R4 provide connections to the +12 volts power supply.

The output of the mixer circuit takes two paths to the bridge network: one through power switch driver 13; the other through the inverter 11 and the power switch driver 15. The inverter has a transistor Q8 which is a common emitter switch and will produce a 180 degree phase difference between signals applied to resistor R10 and the output at resistor R12. Each of the power switch drivers 13 and 15 contain an NPN transistor Q3 or Q9, driving a complementary pair of transistors Q4 and Q5 or Q10 and Q11. Transistors Q4 and Q10 being an NPN type and transistors Q5 and Q11 being a PNP type, provide outputs which are out of phase by 180 degrees.

The out-of-phase input signals applied to the drivers 13 and 15 saturate transistors Q4 and Q11 and simultaneously drive transistors Q10 and Q5 to cutoff or vice versa. This allows bridge operation by maintaining bridge transistors Q6 and Q13 saturated and Q12 and Q7 cutoff or vice versa. Current can, therefore, flow through the torquer (connected to the output of the bridge network) in either direction, depending on the polarity or phase of the input signal.

Diodes CR2, CR3, CR5, and CR6 are provided to protect the bridge transistors during transient conditions and to provide a path for torquer current when a conducting pair of transistors is switched off. For example, when transistors Q6 and Q13 are cut off after they have been conducting to the torquer, the current flow through the torquer cannot stop or change instantaneously because the torquer contains inductance. Diodes CR3 and CR5 will limit the transient voltage caused by the inductance of the torquer and provide current continuity through the torquer with the result that current is forced into the +28v power source. Diode CR4 provides the increased voltage drop necessary to insure that transistor Q13 is not held on by the instantaneous polarity reversal across the torquer before diode CR5 is forward biased. Diodes CR2, CR6, and CR1 perform similar function when transistors Q7 and Q12 have been conducting torquer current and are cut off.

Figure 3:
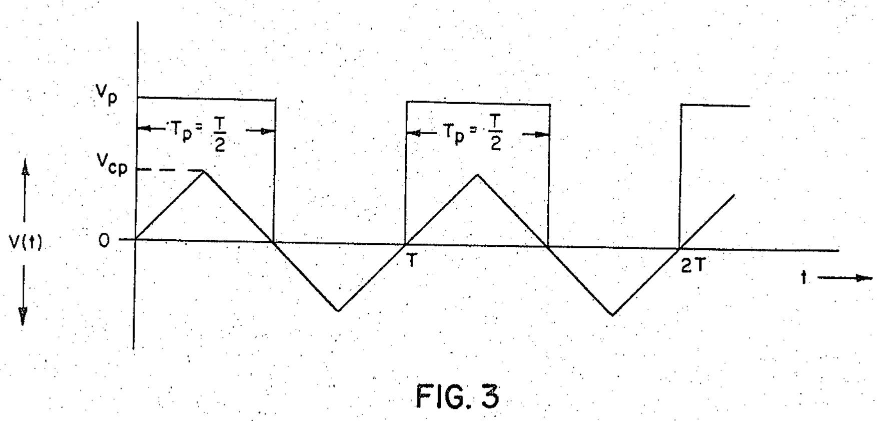
FIGURE 3 illustrates idealized wave forms of signals applied to and derived from the mixer circuit of FIGURES 1 and 2.

The mixer circuit 9 is driven alternately to saturation and cutoff by applying a triangular keying signal 22 to one of its inputs. Idealized input and output waveforms, with no error signal present (zero modulation), are shown in FIGURE 3. The triangular wave is shown referenced about zero for clarity in explaining circuit operation. In actual practice the wave is biased to a level that will overcome the input circuit potential drop, thereby allowing equal on and off times at the output. The waveforms do not indicate the small difference between turn-on and turn-off voltage levels, the collector-emitter saturation voltage level at the output, and the small, but finite, rise and fall times. The on-off output of the mixer drives the remaining circuitry alternately to saturation and cutoff. Proper signals inversion, as set forth above, produces the square waveform (FIGURE 4) between the two bridge output terminals.

Figure 4:
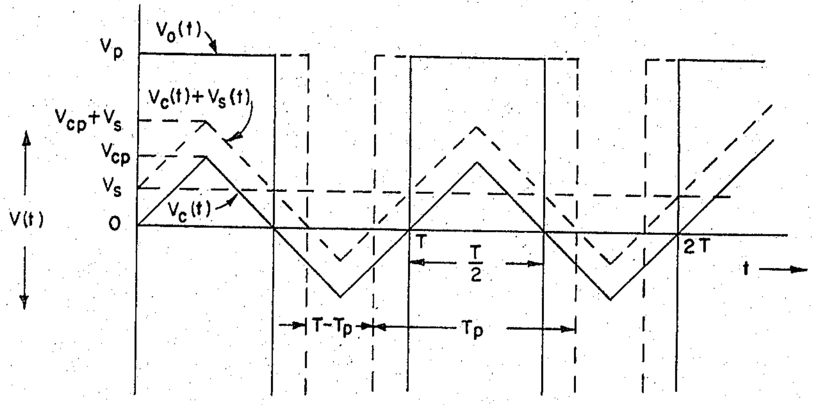
FIGURE 4 illustrates idealized wave forms derived from the mixer and the bridge circuits.

An error signal $v_s(t)$ summed with the triangular wave $v_c(t)$ at the input of the mixer, modulates the width of the positive and negative parts of the square wave (FIGURE 4). The length of time $T_p$ that the wave is positive is a function of the polarity and amplitude of the error signal, as is the corresponding time $T-T_p$ that the wave is negative. In contrast to amplitude modulation, for example, the signal to be transmitted is carried in the width rather than in the amplitude of the carrier.

The pulse width $T_p$ can be derived by referring to FIGURE 4 which shows the idealized, steady state, input and output waveforms. Solid lines represent the signals with zero modulation. Dotted lines represent the signals with the carrier wave modulated by a positive step signal, $v_s(t)=V_s$. This produces an increase in the width $T_p$ of the positive part of the square wave and a corresponding decrease in the negative part as indicated. By noting the geometry of the triangle with base T/2 and the one with base $T_p$ the relationship between pulse width $T_p$ and signal amplitude $V_s$ can be formulated by similar triangles.

$$\frac{T_p}{\frac{T}{2}}=\frac{V_{cp}+V_s}{V_{cp}} \qquad (1)$$

Therefore, $$T_p=\frac{T}{2V_{cp}}V_s+\frac{T}{2} \qquad (2)$$

wherein:

T=Triangular and square wave period (sec.),
$V_{cp}$=Peak value of the triangular wave ($v$), and
$V_s$=A discrete input signal level ($v$).

The pulse width $T_p$ is thus a linear function of the signal amplitude. Solving for $V_s$ in Equation 2 yields $$V_s=V_{cp}\left(2\frac{T_p}{T}-1\right) \qquad (3)$$

The average value $V_{OA}$ of the modulated output voltage wave can be written from inspection of FIGURE 4;

$$V_{OA}=V_p\frac{T_p}{T}-V_p\left(\frac{T-T_p}{T}\right)=V_p\left(\frac{2T_p}{T}-1\right) \qquad (4)$$

The voltage gain G of the amplifier is then given as $$G\frac{V_{OA}}{V_S}=\frac{V_p(2T_p-1)}{V_{cp}\left(\frac{2T_p-1}{T}\right)}=\frac{V_p}{V_{cp}} \qquad (5)$$

The modulation process is inherently incremental, i.e., $T_p$ cannot change smoothly and continuously, but only once every period. Therefore, it is desirable for the carrier frequency ($f_c$) to be much greater than the maximum frequency of interest contained in the input signal. When this condition exists, input signal amplitude information is transferred into discrete pulse widths many times for a given segment of the input signal, and continuous modulation is approached.

The voltage gain of the amplifier depends on the peak value of the triangular wave. Adjusting the peak value is one method for setting amplifier gain. Internal power dissipation in the amplifier is decreased by switching mode operation. During cutoff, transistor dissipation depends on the product of maximum collector voltage and the low value of collector cutoff current. During saturation, low collector-emitter saturation voltage and collector current are the determining factors. Peak dissipation occurs during the transition period between cutoff and saturation. During this time, intermediate values of collector current and voltage determine dissipation. Power dissipation can therefore, be minimized by using transistors characterized by low values of collector cutoff current and collector-emitter saturation voltage, and a fast switching speed. Transistor power dissipation is also a function of the amount of modulation since collector current varies with the amount of modulation. At zero modulation, dissipation is a function of the impedance characteristics of the torquer at a given switching frequency.

A preferred embodiment of the invention has been chosen for purposes of illustration and description. The preferred embodiment illustrated is not intended to be exhaustive nor to limit the invention to the precise form disclosed. It is chosen and described in order to best explain the principles of the invention and their application in practical use to thereby enable others skilled in the art to best utilize the invention in various embodiments and modifications as are best adapted to particular use contemplated. It will be apparent to those skilled in the art that changes may be made in the form of the apparatus disclosed without departing from the spirit of the invention as set forth in the disclosure, and that in some cases certain features of the invention may sometimes be used to advantage without a corresponding use of other features. It is, therefore, to be understood that within the scope of the appended claims the invention may be practiced otherwise than as specifically described. Accordingly, it is desired that the scope of the invention be limited only by the appended claims.

We claim:

1. An amplifier comprising: a mixer having a first and second input and an output; a first and second power switch driver having an input and an output; an inverter having an input and an output; a bridge circuit having a first, second, third, and fourth input and a first and second output; a signal generating means connected to said first input of said mixer; a carrier signal connected to said second input of said mixer; said output of said mixer being connected to said input of said first power switch driver and said input of said inverter; said output of said inverter being connected to said input of said second power switch driver; and said output of said first and second power switch drivers being connected to said bridge circuit, whereby said signal generating means provides bi-directional load current control of a torquer connected to said output of said bridge cricuit.

2. An amplifier as set forth in claim 1 wherein said bridge circuit comprises a first, second, third, and fourth power switch having a first and second input and an output, said output of said first power switch driver being connected to said first input of said first and second power switch, said output of said second power switch driver being connected to said first input of said third and ourth power switch; said second input of said first and third power switches being connected to supply voltage; said second input of said second and fourth power switches being connected to ground; said output of said first and second power switch being connected to said first output of said bridge circuit; and said output of said third and fourth power switch being connected to said second output of said bridge circuit.

References Cited

UNITED STATES PATENTS

| | | |
|---|---|---|
| 3,260,912 | 7/1966 | Gregory. |
| 3,354,366 | 11/1967 | Landy et al. |

ORIS L. RADER, *Primary Examiner.*

THOMAS E. LYNCH, *Assistant Examiner.*

U.S. Cl. X.R.

318—28, 489